United States Patent [19]

Gerharz

[11] 4,420,217

[45] Dec. 13, 1983

[54] SWITCHABLE ON-AXIS OPTICAL BANDSTOP FILTER

[75] Inventor: Reinhold Gerharz, Bethesda, Md.

[73] Assignee: The United States of America as represented by the Secretary of the Army, Washington, D.C.

[21] Appl. No.: 450,322

[22] Filed: Dec. 16, 1982

[51] Int. Cl.³ .......................... G03H 1/04; G02B 5/32
[52] U.S. Cl. ...................................... 350/362; 350/3.7; 350/363
[58] Field of Search ..................... 350/3.62, 359, 363, 350/3.6, 3.70

[56] References Cited

U.S. PATENT DOCUMENTS 4,037,932  7/1977  Haas et al. ......................... 350/393

*Primary Examiner*—Bruce Y. Arnold
*Attorney, Agent, or Firm*—Robert P. Gibson; MIlton W. Lee; Aubrey J. Dunn

[57] ABSTRACT

An optical filter is formed by exposing a photosensitive material to direct and retroreflected coherent optical radiation. These radiations set up standing waves in the material such that, when the material is fixed, variations in parallel, equally spaced layers of some optical property of the material remain. The optical property may be reflectance, index of refraction, or optical density. The layers are spaced apart one-half wavelength of the coherent radiation and act as an interference filter. The material may be capable of being erased and a new filter formed, if desired.

4 Claims, 2 Drawing Figures

SWITCHABLE ON-AXIS OPTICAL BANDSTOP FILTER

The invention described herein may be manufactured, used, and licensed by the U.S. Government for governmental purposes without the payment of any royalties thereon.

BACKGROUND OF THE INVENTION

This invention is in the field of optical interference filters, and is particularly concerned with a filter that is formable by incident coherent radiation and which may be selectively erased. In general, optical interference filters consist of layers of optical materials in which the layers differ in some optical property such as reflectance, refractive index, or density. A typical filter uses alternate layers of relatively high and low indices of refraction, each layer being one-quarter wavelength of the radiation with which one wishes to interfere. Another type of interference filter is the Lippmann filter, in which are contained partially reflecting layers spaced apart one-half wavelength of the radiation to be reflected. The Lippmann filter layers are formed photographically as follows: a medium with photosensitive particles therein (a photographic film) is exposed on one side to coherent radiation and a mirror is placed on the other side to reflect the radiation and set up standing waves in the medium. When the medium is developed, parallel and partially reflective layers form, spaced apart one-half wavelength of the incident radiation. The main problem with these filters is that they are permanent; once formed, they cannot be erased and reformed. Moreover, they are not formable in real time, but must be prepared in advance. The instant invention is able to overcome these disadvantages; it provides a filter which is formable in real time, which may be erased and reformed, and which is formed by the radiation which it is desired to block.

SUMMARY OF THE INVENTION

The invention is a device for separating coherent optical radiation from noncoherent optical radiation, and includes a real-time formable bandstop interference filter and the method of making the filter. The filter is made by exposing a photosensitive material on one side to incident coherent radiation, and reflecting the radiation passing through the material back therethrough, whereby standing waves are set up in the material. These waves induce variations in some optical property of the medium, such as reflectance, index of refraction, or optical density; the variations act as an interference filter to the incident radiation.

DESCRIPTION OF PREFERRED EMBODIMENTS

Figure 1:
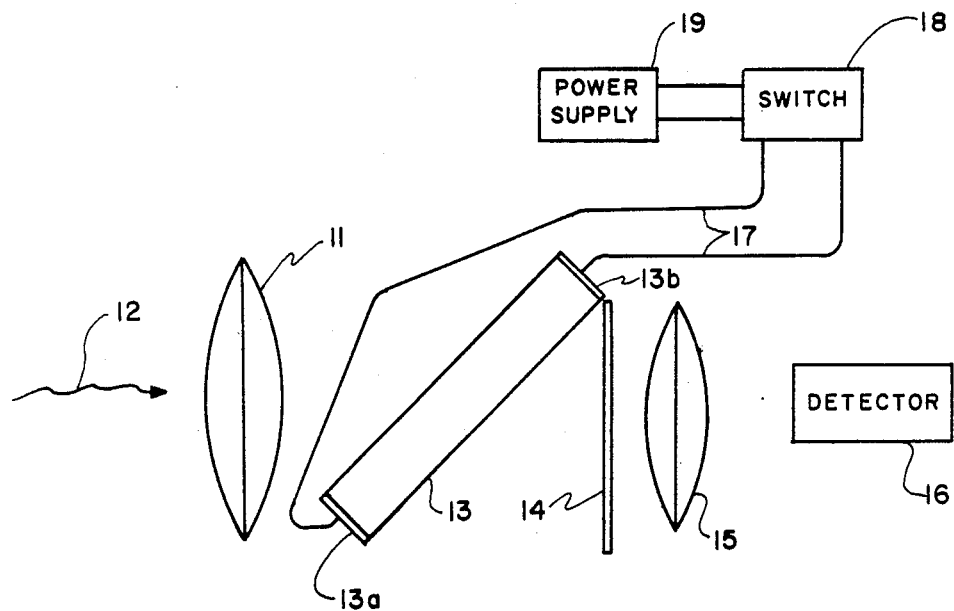
FIG. 1 shows a schematic diagram of one embodiment of the invention.

The invention may be best understood when this description is taken in conjunction with the drawings. The embodiment of FIG. 1 shows lens 11 used to collimate and direct incoming radiation 12 onto filter 13. On the opposite side of 13 is a partially reflecting mirror 14, lens 15, and detector 16; the radiation passing through 13 and 14 is focused by 15 onto 16. Filter 13 has electrodes 13a and 13b on opposite ends thereof, connected by electrical conductors 17 to switch 18. This switch controls the power from power supply 19 for erasing or fixing filter 13. The particular voltages and polarities provided by supply 19 and controlled by switch 18 depend upon the particular material used for 13. An example of a material for 13 is PLZT (lead lanthenum zirconate titanate), as described in the article entitled "Ion-Implanted PLZT Ceramics: A New High-Sensitivity Image Storage Medium" in {IEEE Transactions On Electron Devices}, Vol. ED-28, No. 6, June 1981, pages 756–762.

Figure 2:
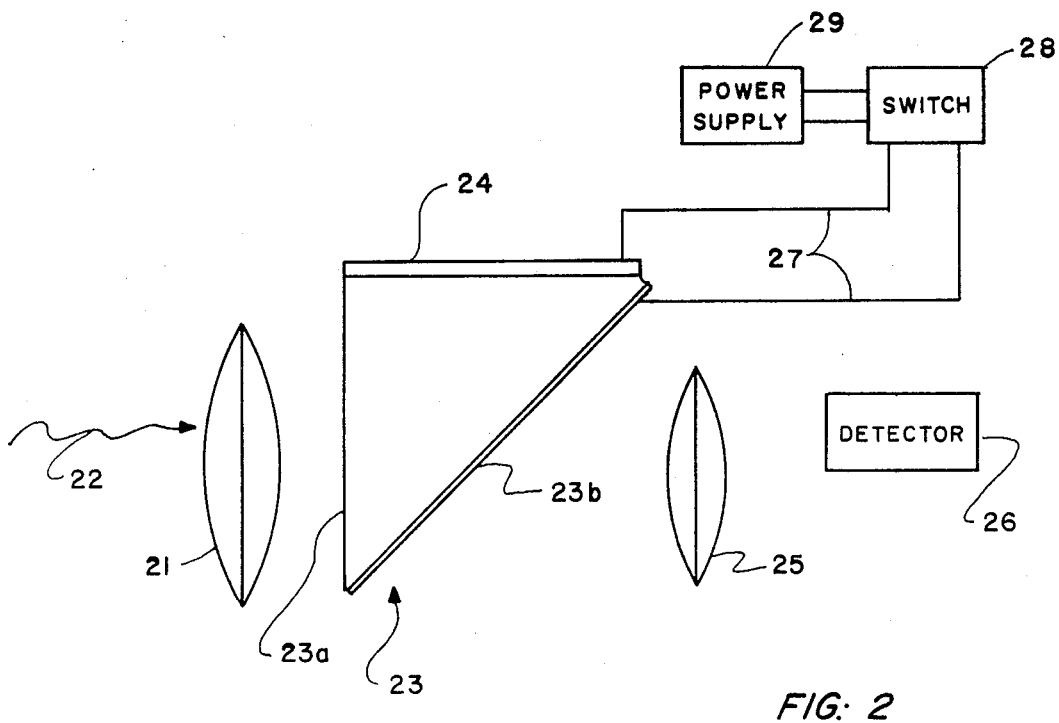
FIG. 2 shows a schematic diagram of another embodiment of the invention.

FIG. 2 shows another embodiment of the invention similar to FIG. 1 except for the filter. In FIG. 2, reference numerals 21, 22 and 25–29 correspond to reference numerals 11, 12 and 15–19 of FIG. 1. The filter of FIG. 2, generally designated 23, includes photosensitive material 23a, partially reflecting mirror 23b, and fully reflecting mirror 24. Mirrors 23b and 24 together act as a corner reflector and set up standing waves in 23a for coherent incident radiation; these standing waves cause a square honeycomb variation in the optical property of 23a.

The method by which filter 13 or 23 is formed is straightforward: 13 or 23 is sensitized with the proper voltage and polarity, coherent radiation is directed through (and retroreflected back through) 13 or 23 to establish standing waves therein, and the correct voltage and polarity are applied to optically fix these waves. Obviously, more than one wavelength of coherent radiation may be used to make the filter; the filter will act as an interference filter to each such wavelength of radiation. If desired, the filter may be erased when desired by applying the proper voltage and may be reformed.

Since an interference filter is formed, this filter strongly interferes with or attenuates coherent radiation of the wavelength which formed the filter, but attenuates noncoherent radiation much less. The filter may thus be used to separate noncoherent and low level signal information from intense coherent radiation (as may come from a laser).

I claim:

1. An optical bandstop filter capable of being erased and a new filter formed, including:
   an erasable photosensitive medium;
   means for directing coherent and noncoherent optical radiation through said medium;
   means for retroreflecting said radiation into said medium whereby the coherent radiation establishes standing waves in said medium; and
   means for fixing said standing wave in said medium whereby an interference filter for said coherent radiation is formed.

2. The filter as recited in claim 1 wherein said medium is photorefractive.

3. The filter as recited in claim 1 wherein said medium is photoferroelectric.

4. A method of making an optical bandpass filter in an erasable photosensitive medium including the steps of:
   erasing any latent image in said medium;
   directing parallel rays of coherent and monocromatic light of the desired bandpass wavelength through the medium;
   reflecting by a mirror said rays back through said medium, whereby a standingwave pattern is established in said medium and whereby the regions of the medium wherein the standing waves are at maxima are most affected by said waves, such that a pattern of layers of different optical properties, spaced at half wavelengths of said rays, remains in said medium when said mirror is removed; and
   fixing said pattern.

* * * * *